US009040644B2

(12) United States Patent
Canivet et al.

(10) Patent No.: US 9,040,644 B2
(45) Date of Patent: May 26, 2015

(54) PROCESS FOR PREPARING A DIENE ELASTOMER, SUCH AS A POLYBUTADIENE

(75) Inventors: Clotilde Canivet, Lempdes (FR); Jean-Philippe Rasigade, Clermont-Ferrand (FR); Fanny Barbotin, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE, S.A., Granges-Paccot (CH)

( * ) Notice: Subject to any disclaimer, the term of this patent is extended or adjusted under 35 U.S.C. 154(b) by 2178 days.

(21) Appl. No.: 11/922,097

(22) PCT Filed: Apr. 6, 2006

(86) PCT No.: PCT/EP2006/003151
§ 371 (c)(1),
(2), (4) Date: Apr. 9, 2009

(87) PCT Pub. No.: WO2006/133757
PCT Pub. Date: Dec. 21, 2006

(65) Prior Publication Data
US 2010/0041843 A1 Feb. 18, 2010

(30) Foreign Application Priority Data
Jun. 14, 2005 (FR) ..................... 05 06040

(51) Int. Cl.
C08F 4/06 (2006.01)
C08F 4/52 (2006.01)
C08F 136/06 (2006.01)
C08F 136/08 (2006.01)

(52) U.S. Cl.
CPC ............. *C08F 136/06* (2013.01); *C08F 136/08* (2013.01)

(58) Field of Classification Search
CPC ....... C08F 136/06; C08F 136/08; C08F 4/545
USPC ................................. 526/192, 185
See application file for complete search history.

(56) References Cited

U.S. PATENT DOCUMENTS

| 4,533,711 | A | * | 8/1985 | Takeuchi et al. ........... 526/340.4 |
| 5,326,838 | A | * | 7/1994 | Ruiz Santa Quiteria et al. .............. 526/187 |
| 5,567,784 | A | * | 10/1996 | Wieder et al. ............... 526/164 |
| 6,130,299 | A | * | 10/2000 | Sone et al. .................... 526/89 |
| 6,255,420 | B1 | * | 7/2001 | Dietz et al. ................... 526/185 |
| 6,441,107 | B1 | * | 8/2002 | Muruganandam et al. ..... 526/60 |
| 6,482,906 | B1 | | 11/2002 | Tocchetto Pires et al. |
| 6,492,476 | B1 | * | 12/2002 | Knauf et al. .................. 526/164 |
| 6,949,489 | B1 | * | 9/2005 | Barbotin et al. .............. 502/154 |
| 7,056,998 | B2 | * | 6/2006 | Laubry et al. ................. 526/164 |
| 7,485,765 | B2 | * | 2/2009 | Barbotin et al. .............. 585/529 |
| 2003/0065083 | A1 | * | 4/2003 | Sone et al. .................... 524/492 |
| 2003/0069365 | A1 | * | 4/2003 | Grun et al. ................. 525/331.9 |
| 2003/0134999 | A1 | * | 7/2003 | Windisch et al. ............. 526/188 |
| 2003/0187162 | A1 | * | 10/2003 | Rachita et al. ................ 526/164 |
| 2004/0009870 | A1 | * | 1/2004 | Laubry ......................... 502/152 |
| 2004/0019171 | A1 | * | 1/2004 | Laubry ......................... 526/335 |
| 2004/0102589 | A1 | | 5/2004 | Jang et al. |
| 2004/0116638 | A1 | * | 6/2004 | Ozawa et al. ................. 526/335 |
| 2005/0004333 | A1 | * | 1/2005 | Laubry ......................... 526/164 |
| 2005/0130835 | A1 | * | 6/2005 | Laubry et al. ................. 502/117 |
| 2005/0261439 | A1 | * | 11/2005 | Stere et al. ................. 525/331.9 |
| 2005/0283036 | A1 | * | 12/2005 | Barbotin et al. .............. 585/521 |
| 2006/0160969 | A1 | * | 7/2006 | Boisson et al. ............... 526/164 |
| 2009/0182106 | A1 | * | 7/2009 | Parola et al. .................. 526/161 |

FOREIGN PATENT DOCUMENTS

| EP | 1 055 659 A | 11/2000 |
| JP | 59-45311 A | 3/1984 |
| WO | WO 03097708 A | 11/2003 |
| WO | WO 2004046213 A1 * | 6/2004 ............. C08F 36/06 |

OTHER PUBLICATIONS

Quirk et al., Polymer 41, 2000, 5903-5908.*

* cited by examiner

Primary Examiner — Liam J Heincer
(74) Attorney, Agent, or Firm — Dickinson Wright PLLC

(57) ABSTRACT

The present invention relates to a process for preparing a diene elastomer. The invention especially applies to the production of a polybutadiene with a high level of cis-1,4 linkages that has at the same time a Mooney viscosity ML (1+4) greater than or equal to 40, a polydispersity index less than 2.1 and a reduced cold flow and of a polyisoprene.

The process according to the invention comprises a reaction of a catalyst system with at least one conjugated diene monomer, this catalyst system being based on at least:
  one conjugated diene;
  one organic phosphoric acid salt of one or more rare-earth metals, said salt being in suspension and in at least one saturated and aliphatic or alicyclic, and inert hydrocarbon-based solvent;
  one alkylating agent composed of an alkyl aluminum for formula $AlR_3$ or $HAlR_2$ and
  a halogen donor belonging to the family of alkylaluminium halides, with the exclusion of alkylaluminium sesquihalides.

This process comprises a separate bringing together of the monomer(s) to be polymerized with at least one alkylaluminium compound of formula $AlR_3$ or $HAlR_2$ which is identical or not to the alkylating agent of said catalyst system, said amount being chosen as a function of the characteristics of the polymerization medium and/or the polymerization conditions and/or said elastomer to be obtained.

21 Claims, 4 Drawing Sheets

PROCESS FOR PREPARING A DIENE ELASTOMER, SUCH AS A POLYBUTADIENE

BACKGROUND

1. Field

The present invention relates to a process for preparing diene elastomers, such as butadiene or isoprene homopolymers or copolymers. The invention especially applies to the production of a polybutadiene with a high level of cis-1,4 linkages that has at the same time a Mooney viscosity ML(1+4) greater than or equal to 40, a polydispersity index less than 2.3 and a reduced cold flow, preferably less than 0.3.

2. Description of Related Art

In order to prepare butadiene or isoprene homopolymers or copolymers having a high level of cis-1,4 linkages, it is known to use catalyst systems based on:
- a salt of a rare-earth element in solution in a hydrocarbon-based solvent;
- an alkylating agent of this salt formed from an alkylaluminium; and
- an alkylaluminium halide.

Thus, Patent Document RU 2,139,298 C1 teaches a process for polymerization of cis-1,4-polyisoprene and polybutadiene by polymerization of the diene using a "preformed" catalyst system comprising 3 constituents:
(a) a rare-earth carboxylate;
(b) an alkylaluminium sesquichloride; and
(c) a non-halogenated organometallic aluminium compound.

The non-halogenated organometallic aluminium compound is added either before, or after the other constituents a) and b) of the catalyst.

This separate introduction of the constituents c) relative to the constituents a) and b), by varying the amount introduced and the organo Al/rare earth molar ratio, makes it possible on the one hand to reduce the amounts of rare-earth catalyst and of non-halogenated organometallic aluminium agent required and on the other hand to confer a certain flexibility to the polymerization process. Polymerization in a battery of reactors makes it possible to regulate the characteristics of the targeted polymers and, to a certain extent, to improve the cold flow which remains, however, detrimental from an industrial processing point of view for the polymers thus obtained.

Patent document EP B 1 055 659 teaches, in order to obtain a polybutadiene having a high level of cis-1,4 units, the use of a catalyst system having three constituents:
(a) a neodymium neododecanoate;
(b) an alkylaluminium compound or the corresponding hydride; and
(c) an organic halide,
optionally in the presence of an alkylaluminium as a chain modifier by way of its transfer agent properties that regulates the molecular weight.

Patent document JP-A-59-45 311 describes a process for preparing (in 2 phases) polybutadiene having a level of cis-1,4 units greater than 70% using a catalyst based on rare-earth elements from the family of lanthanides, an alkylaluminium compound as an alkylating agent and an alkylaluminium halide, the first phase consisting in polymerizing the butadiene in the presence of the above catalyst and the second phase consisting in adding, after 3% conversion of the monomer, an aluminium hydride. This separate addition of the aluminium hydride makes it possible to improve certain properties of the polybutadiene due to the possibility of controlling, to a certain extent, the molecular weight distribution and in particular of widening the molecular weight distribution.

Patent document EP-B 207 558 teaches, in order to obtain a butadiene homopolymer or copolymer having a Mooney viscosity that is more or less independent of the degree of conversion of the monomers:

initiating the polymerization reaction with a catalyst system comprising:
a) a neodymium compound chosen from neodymium oxide, and neodymium alkoxides, phenates and carboxylates;
b) an organic compound having a hydroxyl or carboxyl group;
c) a non-halogenated organometallic aluminium compound; and
d) a halogenated compound chosen from secondary or tertiary alkyl halides, organic acid halides, metal and organometallic halides, hydrogen halide acids and halogens,
so that the aluminium/neodymium molar ratio in this catalyst system varies from 10 to 30; and
adding in continuous or batch mode, after the start of the polymerization reaction and over a time period at least equal to half of the total duration of this reaction, a given amount of this compound c) until an aluminium/neodymium molar ratio ranging from 20 to 80 is obtained.

As indicated in the exemplary embodiments of this document, the purpose of this addition of the organoaluminium compound after the initiation of the polymerization reaction is to use its transfer agent properties regulating the molecular weight and thus to obtain Mooney viscosities ML (1+4) which are approximately constant and below the Mooney viscosities which are obtained by adding this compound at the same time as the catalyst system, that is to say less than or equal to 40, which does not make these polybutadienes well suited for use in tyre cover treads.

Patent documents WO-A-02/38636 and WO-A-03/097708 in the name of the Applicants teach, in order to obtain polybutadienes and polyisoprenes, to use a "preformed" type catalyst system based on at least:
- one preforming conjugated diene, such as butadiene;
- one organic phosphoric acid salt of one or more rare-earth metals, which is in suspension and in at least one saturated and aliphatic or alicyclic, and inert hydrocarbon-based solvent;
- one alkylating agent composed of an alkyl aluminium of formula $AlR_3$ or $HAlR_2$ in which R represents an alkyl radical, preferably of 1 to 8 carbon atoms and H a hydrogen atom; and
- a halogen donor which belongs to the family of alkylaluminium halides, with the exclusion of alkylaluminium sesquihalides.

The polybutadienes obtained by means of this catalyst system have, in particular, a polydispersity index less than 2.1 and a Mooney viscosity ML(1+4) at 100° C. which may be within a relatively wide range of values, of around 25 to 80. These combined characteristics make these polybutadienes well suited for use in tyre cover treads.

The polyisoprenes as obtained by means of this catalyst system have, in particular, a polydispersity index less than 2.30 and a Mooney viscosity ML(1+4) at 100° C. which may be within a relatively wide range of values, of around 40 to 100. These combined characteristics make these polyisoprenes well suited for use in tyre cover treads.

Two weaknesses exist however for this catalyst system. Firstly, the synthesis is carried out batch mode but furthermore, the relative proportions of the four constituents are fixed as a function of the diene monomer(s) to be polymerized, the desired characteristics for the expected polymer, the polymerization process (residence time and temperature imposed by the material for example) and the level of impurities present in the industrial unit used to carry out the polymerization. It is thus easy to understand, for a person skilled in the art, that these last two elements (synthesis of the catalyst in batch mode and formulating depending on 4 parameters) result in a lack of flexibility of the catalyst system and therefore of the polymerization process, especially in the context of application on an industrial scale.

SUMMARY

One or more objects of one or more embodiments of the methods disclosed herein include improving the activity of the preformed catalyst system in order to make it more flexible with respect to the polymerizable monomers, the desired characteristics for the polymers to be synthesized, fluctuations in the level of impurities present in the polymerization reactor and more generally in the industrial unit, the residence time in the polymerization reactor, so that its industrial application is more advantageous.

Within the scope of research having the aim of adapting the polymerizing processes by means of the latter catalyst system to the diene elastomers to be obtained and to the polymerization conditions encountered, the Applicants have discovered that the "separate" introduction, in the industrial polymerization unit, that is to say not at the same time and, consequently, either before or after or partly before and partly after, relative to the introduction of the preformed catalyst system used for the polymerization reaction, of at least one alkylaluminium compound of formula $AlR_3$ or $HAlR_2$ in which R represents an alkyl radical, preferably having 1 to 8 carbon atoms, and H represents a hydrogen atom, which is identical or not to that of said catalyst system used as an alkylating agent, makes it possible to obtain, with good flexibility and lower cost, diene elastomers having a high level of cis-1,4-linkages, such as butadiene or isoprene homopolymers or copolymers which have, at the same time, Mooney viscosity ML(1+4) at 100 C, narrow molecular weight distribution and cold flow properties which are quite satisfactory for use in tyre cover treads.

The amount of at least one alkylaluminium compound of formula $AlR_3$ or $HAlR_2$, which is identical or not to that of the alkylating agent of said catalyst system, added is variable as it is a function of one or more or all the reaction parameters listed, non-limitingly, below, especially of the diene monomer(s) to be polymerized or copolymerized, the polymerization conditions, the desired macro structural and/or microstructural characteristics of the diene elastomer to be obtained, the fluctuating level of impurities present in the industrial polymerization unit, especially in the polymerization solvent, and the residence time in the polymerization reactor.

A person skilled in the art will adjust, in the industrial polymerization unit, as known per se, the amount of alkylaluminium compound to be added separately to the catalyst system as a function of the parameter(s) taken into consideration.

According to one preferred implementation method of the invention, the separate introduction of said alkylaluminium compound is carried out by introducing all of said alkylaluminium compound before introducing the catalyst system and, as a result, before the polymerization of the monomer or monomers to be polymerized or copolymerized.

It should be noted that the separate introduction of said alkylaluminium compound relative to the introduction of the preformed catalyst system, but before polymerization of the monomer(s), makes it possible to control the activity of said catalyst system as a function of the nature of the chosen monomer(s) and the macrostructure characteristics of the diene elastomer that it is desired to obtain, such as its Mooney viscosity. It is thus possible to vary, on a unit dedicated to the polymerization of monomers with different respective reactivities and/or dedicated to obtaining elastomers that have a wide range of Mooney viscosities, that is to say between 25 and 100, the activity of the catalyst system used and therefore the polymerization yield, while using one and the same catalyst system formula.

It should also be noted that this separate addition of said alkylaluminium compound with respect to the catalyst system, preferably before polymerization, makes it possible to control the activity of the catalyst system as a function of the polymerization conditions used in the industrial unit, such as the temperature and/or the residence time in the or each polymerization reactor, which may especially account for a gain in productivity in the case of a reduction in the residence time for obtaining an elastomer of given characteristics.

It should moreover be noted that the reduced cold flow of the elastomers which is obtained due to the process according to the invention attests to a high level of branching of the elastomers obtained, without use of a "jumping" type post-polymerization reaction using halogenated compounds that may or may not contain sulphur. This reduced cold flow is expressed by the reduced aptitude of the elastomers to flow under a load equal to their own weight especially when samples or "balls" of these elastomers are stacked on top of each other in storage crates. This results in a minimization of the risk of the samples overflowing the crates, therefore causing a collapse of these crates and opposing the extraction of the elastomers. The cold flow is less than 0.5 g and more advantageously less than 0.3 g and greater than or equal to 0.01 g.

It should be noted that the separate introduction of the alkylaluminium compound may also be carried out after that of the preformed catalyst system into a catalyst line inlet, but before polymerization of the monomer(s) to be polymerized.

According to another feature of the invention, said polymerization reaction may be carried out in dilute or concentrated medium (the term "concentrated medium" is understood to mean a monomer concentration in the solvent between 30 to 70% by weight) in an inert hydrocarbon-based polymerization solvent, such as pentane, cyclohexane or methylcyclohexane, or else in bulk, at a temperature preferably ranging from 0 to 100 C.

According to another advantageous feature of the invention, the alkylating agent/salt of rare-earth element(s) molar ratio in said catalyst system has a reduced value ranging from 1 to 10 and, even more advantageously, a value ranging from 1 to 5.

It should be noted that the addition, according to the invention, of said alkylaluminium compound before the use of the catalyst system having this reduced molar ratio value makes it possible to reproduce, in terms of macrostructure of the elastomer (Mooney viscosity and high level of cis-1,4 linkages in particular), the result obtained with a similar catalyst system but of which the aforementioned molar ratio will be higher.

It is essential to note here that this use of a low alkylating agent/salt of rare-earth element(s) molar ratio in the catalyst system is possible due to the fact that the latter comprises the specific selection of an organic phosphoric acid salt of rare-earth element(s) from the assembly of all the rare-earth compounds used in the prior art, such as the neodymium carboxylates tested in the aforementioned document EP-B-207 558 which cannot be used in the process according to the invention.

It should moreover be noted that this use of said molar ratio having a reduced value, together with the separate, and preferably prior, addition of said alkylaluminium compound, is advantageously expressed by a lower total amount of alkylaluminium(s) (used both in said catalyst system and before polymerization), which implies a significant reduction in the cost of carrying out the process according to the invention in comparison with a process which may use a similar catalyst system but of which the aforementioned molar ratio may be higher and which would not include this prior addition of the organoaluminium compound.

The following molar ratio: alkylaluminium compound added separately and preferably before reaction/alkylaluminium (alkylating agent) in the catalyst system is strictly greater than 0 and according to one advantageous implementation method varies from 0.01 to 10, preferably from 0.05 to 3, and more preferably from 0.05 to 1.

According to another preferred feature of the invention, the amount of said alkylaluminium compound introduced separately varies from 10 to 5000 µmol per 100 g of conjugated diene monomer to be polymerized, especially as a function of the desired macrostructure characteristics for said elastomer and/or the amount of impurities present in the industrial polymerization unit, such as impurities stemming from recycled solvents.

Even more preferably, it is possible to use said alkylaluminium compound in an amount ranging from 50 to 1,000 µmol per 100 g of conjugated diene monomer to be polymerized, then said catalyst system is used in an alkylating agent/salt of rare-earth element(s) molar ratio ranging from 1 to 5.

The polymerization reaction may be carried out as is known per se, in continuous mode, in batch mode, in solution, in bulk or in a concentrated medium.

Advantageously, the polymerization reaction is carried out continuously, said alkylaluminium compound being brought together with said monomer(s) to be polymerized in a line inlet situated upstream of at least one polymerization reactor of the industrial polymerization unit.

It should be noted that in this case, and this being all the more so when the aforementioned molar ratio is further reduced, the addition of the alkylaluminium compound before polymerization makes it possible to clear the fluctuations over time of the impurities due to the polymerization solvents which are recycled into the line inlet and not to penalize, due to these fluctuations, the activity of the catalyst system, so as to minimize the dispersion of the characteristics of the elastomer obtained.

It should be noted that the separate addition of the alkylaluminium compound also makes it possible to clear the fluctuations over time of the conventional reactants and additives for anionic polymerization which are to be considered as impurities for a catalyst system based on rare-earth elements and which are present in an industrial polymerization unit that operates by elastomer production runs alternately via anionic catalysis and by catalysis based on salts of rare-earth metals.

It should be noted that the separate addition of the alkylaluminium compound also makes it possible to reduce, even in the presence of such impurities, the aforementioned reproduction of the result obtained by a similar catalyst system, but of which the aforementioned molar ratio is higher.

It should be noted that the separate addition of the alkylaluminium compound makes it possible to control, at any moment, the alkylating agent/rare-earth salt ratio via the amount of alkylaluminium compound added at the various times and thus to have a truly flexible polymerization process that makes it possible to control or vary predictively and simply, the activity of the catalyst system.

According to another implementation method of the invention, said catalyst system is incorporated in its entirety in the industrial polymerization unit directly in the polymerization reactor.

In other words, the preparation process according to the invention has a great flexibility for use in continuous or batch polymerization, due to the fact that it makes the single catalyst system used equivalent to a range of catalyst systems having different activities and makes it possible to have a mixed polymerization line alternately allowing an anionic polymerization for preparing homopolymers of conjugated dienes and copolymers of conjugated diene(s) and of vinyl aromatic compound(s), especially polybutadienes and SBRs, and a polymerization using rare-earth metals to prepare homopolymers of conjugated diene(s) and copolymers of conjugated diene(s).

As a "preformed" type catalyst system that can be used in the polymerization process according to the invention, reference will be made to the aforementioned documents WO-A-02/38636 and WO-A-03/097708 in the name of the Applicants. Of course, the expression "based on" used to define the constituents of this catalyst system, is understood to mean the mixture of these constituents and/or the product of the reaction between these constituents.

As the conjugated diene monomer that can be used to "preform" the catalyst system according to the invention, mention may be made, preferably, of 1,3-butadiene.

Mention may also be made of 2-methyl-1,3-butadiene (or isoprene), 2,3-di($C_1$-$C_5$ alkyl)-1,3-butadienes such as for example 2,3-dimethyl-1,3-butadiene, 2,3-diethyl-1,3-butadiene, 2-methyl-3-ethyl-1,3-butadiene, 2-methyl-3-isopropyl-1,3-butadiene, phenyl-1,3-butadiene, 1,3-pentadiene, 2,4-hexadiene, or any other conjugated diene having between 4 and 8 carbon atoms.

It should be noted that the preforming monomer/rare-earth salt molar ratio may have a value ranging from 15 to 70 and advantageously from 25 to 50.

The rare-earth salt is formed from a non-hygroscopic powder having a slight tendency to agglomerate at room temperature.

According to one preferred embodiment of the invention, the inert hydrocarbon-based solvent in which said rare-earth salt is in suspension is an aliphatic or alicyclic solvent of low molecular weight, such as cyclohexane, methylcyclohexane, n-heptane or a mixture of these solvents.

Even more preferably, methylcyclohexane is used as the inert hydrocarbon-based solvent.

According to another embodiment of the catalyst system used in the invention, said solvent used for suspending the rare-earth salt is a mixture of a high molecular weight aliphatic solvent comprising a liquid paraffin, for example liquid petrolatum, and a low molecular weight solvent such as those mentioned above (for example, cyclohexane or methylcyclohexane). This suspension is then prepared by dispersive grinding of the rare-earth salt in this liquid paraffin, so as to obtain a very fine and homogeneous suspension of the salt.

According to one preferred exemplary embodiment of the invention, a tris[bis(2-ethylhexyl)phosphate] of said rare-earth metal or metals is used as the salt.

Even more preferably, said rare-earth salt is neodymium tris[bis(2-ethylhexyl)phosphate] ($Nd(P_2O_4)_3$ as abbreviated below).

As an alkylaluminium that can be used to form said alkylating agent in the catalyst system, and said alkylaluminium compound added, according to the invention, separately with respect to the preformed catalyst system, that is to say before or after the catalyst system for polymerization, mention may be made of alkylaluminiums such as:

trialkylaluminiums, for example triisobutylaluminium; or
dialkylaluminium hydrides, for example diisobutylaluminium hydride.

It should be noted that the alkylating agent and the alkylaluminium compound are preferably formed from diisobutylaluminium hydride.

As an alkylaluminium halide that can be used as a halogen donor in the catalyst system according to the invention, an alkylaluminium monohalide is preferably used, and even more preferably diethylaluminium chloride.

According to the invention, it should be noted that the halogen donor/rare-earth salt molar ratio may have a value ranging from 2 to 3.5 and preferably ranging from 2.6 to 3.

According to one advantageous embodiment of the invention, in order to form the catalyst system, diisobutylaluminium hydride and diethylaluminium chloride are used in combination as an alkylating agent and a halogen donor respectively.

It should be noted that the alkylaluminium sesquihalides, such as ethylaluminium sesquichlorides, cannot be used in the catalyst systems used in the process according to the invention, due to the fact that they result in a strong deterioration of the catalytic activity, especially in terms of percentage conversion, and make it difficult to obtain polybutadienes having a polydispersity index below 2.1.

According to another feature of the process according to the invention, said catalyst system comprises the rare-earth metal or metals in a concentration greater than or equal to 0.002 mol/l and preferably ranging from 0.010 mol/l to 0.1 mol/l and, more advantageously, a concentration equal or approximately equal to 0.02 mol/l.

It should also be noted that this exclusion of the alkylaluminium sesquihalides combined with this minimum concentration of 0.002 mol/l of rare-earth metal or metals for the production of polybutadienes makes it possible to obtain polybutadienes having at the same time a Mooney viscosity ML(1+4) at 100° C. greater than or equal to 40 and a polydispersity index Ip below 2.1 and polyisoprenes that have at the same time a Mooney viscosity (1+4) at 100° C. greater than or equal to 60 and a polydispersity index below 2.3.

The catalyst systems used in the process according to the invention are prepared by implementing the following steps:
- in a first optional solvation step, a suspension of said salt of rare-earth element(s) is prepared in said inert hydrocarbon-based solvent;
- in a second step, added to the suspension obtained in the first step is said conjugated diene monomer or else, in the case where the first step has not been carried out, said solvent in addition to said conjugated diene monomer is added to said salt;
- in a third step, said alkylating agent is added to the suspension obtained at the end of said second step in order to obtain an alkylated salt; and
- in a fourth step, said halogen donor is added to said alkylated salt.

A diene elastomer which may be prepared by the process according to the invention, mention may be made of any homopolymer or copolymer obtained by homopolymerization or copolymerization of at least one conjugated diene monomer having from 4 to 12 carbon atoms.

As conjugated diene monomer(s), the following are especially suitable: 1,3-butadiene, isoprene, 2,3-di($C_1$-$C_5$ alkyl)-1,3-butadienes such as for example 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene, 2,4-hexadiene.

The elastomers may be, for example, non-linear block, random, linear block or microblock polymers.

Particularly preferably, said diene elastomer is chosen from the group of highly unsaturated diene elastomers formed by polybutadienes (BR) and synthetic polyisoprenes (IR).

It should be noted that the catalyst systems used in the process according to the invention make it possible in particular to obtain polybutadienes having a high and reproducible level of cis-1,4 linkages greater than 90% (measured by the near-infrared (NIR) assay technique, see the attached Appendix 1), and similarly polyisoprenes having a high and reproducible level of cis-1,4-linkages greater than 96% (measured by the near-infrared (NIR) assay technique, see the attached Appendix 1).

Advantageously, the process according to the invention makes it possible to obtain, when the polymerization is carried out at a temperature ranging from 25° C. to 55° C., polyisoprenes having levels of cis-1,4 linkages, measured according to the mid-infrared assay technique, which belong to a domain ranging from 98.0 to 98.5% (to within measurement uncertainties of ±0.1%, which are inherent to this technique).

The aforementioned features of the present invention, and also other features, will be better understood on reading the following description of several exemplary embodiments of the invention, given by way of illustration and non-limitingly in relation with the appended drawings, among which:

BRIEF DESCRIPTION OF DRAWINGS

The methods and compositions disclosed herein can be more clearly understood by reference to the drawings, which are intended to illustrate, not to limit, the scope of the appended claims.

FIG. 4 is a graph illustrating the change in the degree of conversion (in %) of butadiene as a function of time (min) as a function of the halogenating agent which is, on the one hand a non-conforming halogen donor: diethylaluminium sesquichloride, and on the other hand a halogen donor that conforms to the invention: diethylaluminium chloride.

FIG. 5 is a graph illustrating the change in the degree of conversion (in %) of butadiene as a function of time (min) and of the nature of the rare-earth salt used for the catalyst system. This is on the one hand a non-conforming neodymium carboxylate: neodymium tris[2-ethylhexanoate] and on the other hand a neodymium phosphate that conforms to the invention: neodymium tris[bis(2-ethylhexyl)phosphate)].

FIG. 6 is a graph illustrating the change in the degree of conversion (in %) of butadiene as a function of time (min) and of the separate supply, in one go, of all of the alkylaluminium having various alkylaluminium (added before the polymerization reaction)/rare-earth salt ratios.

FIG. 7 is a graph illustrating the change in the degree of conversion (in %) of butadiene as a function of time (min) and of the concentration of the Nd salt for various alkylaluminium (added before the polymerization reaction)/rare-earth salt ratios, on the one hand for a polymerization test conforming to the invention with a common concentration of rare-earth salt of 0.02 mol/l, and on the other hand a comparative polymerization test with a rare-earth salt concentration reduced by a factor of 100.

FIG. 8 is a graph illustrating the change in the degree of conversion (in %) of isoprene as a function of time (min) and of the supply, on the one hand of all of the alkylaluminum in the form of alkylating agent in one go, and on the other hand of the separate supply of alkylaluminum (added before the polymerization reaction) at various alkylaluminum/rare-earth salt ratios.

Figure 1:
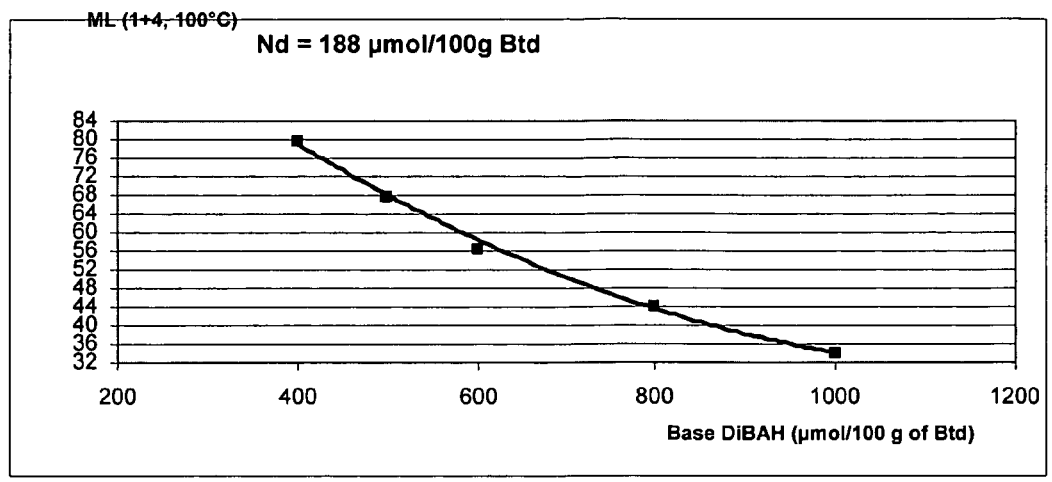
FIG. 1 is a graph illustrating the variation of the Mooney viscosity ML(1+4) of polybutadienes prepared according to the process of the invention, as a function of the amount of the alkylaluminium compound added before the polymerization reaction.

The microstructure of the elastomers is determined according to the "near-infrared" assay technique described in Appendix 1.

The molecular weight distribution of the elastomers is determined according to the size exclusion chromatography (SEC) technique described in Appendix 2.

The viscoelastic indices cotanδ are measured according to the method described in Appendix 3.

The cold flow is measured according to the method described in Appendix 4.

DETAILED DESCRIPTION OF SPECIFIC EMBODIMENTS

I. Preparation of Catalyst Systems

Six catalyst systems 1 to 6 were prepared according to the invention, by following the preparation method described in paragraph I of the aforementioned document WO-A-03/097708 in the name of the Applicant.

For the purpose of obtaining each of these catalyst systems 1 to 6, the corresponding neodymium salt in powder form was poured into a reactor previously cleaned of its impurities. Next, this salt was subjected to nitrogen sparging for 15 min, then the following successive steps were carried out for each catalyst system 1 to 6:

First Step of Solvation:

A solvent composed of methylcyclohexane (MCH) was introduced into the reactor containing the neodymium salt for the purpose of forming a gel, the contacting time and temperature of this solvent and of the neodymium salt were 30 minutes at a temperature of 30° C.

Second Step of "Preforming":

Next, butadiene was introduced into the reactor at a temperature of 30° C.

Third Step of Alkylation:

Diisobutylaluminium hydride (DiBAH) was then introduced into the reactor as an alkylating agent of the neodymium salt, in a concentration of around 1 M. The alkylation time was 15 min. The temperature of the alkylation reaction was equal to 30° C.

Fourth Step of Halogenation:

Next, diethylaluminium chloride (DEAC) was introduced into the reactor as a halogen donor, in a concentration of around 1 M. The temperature of the reaction medium was brought to 60° C.

Fifth Step of Ageing:

Next, ageing of the mixture thus obtained was carried out by maintaining this temperature of 60° C. for a duration of 60 min.

Finally, each catalyst solution obtained was stored under a nitrogen atmosphere at a temperature between −15° C. and −5° C.

The catalyst systems 1 to 6 obtained according to the invention had the following molar ratios (butadiene, alkylating agent and halogen donor "HD") relative to the neodymium salt: Nd/butadiene/DiBAH/HD=1/50/x/3.

With x: DiBAH/ND molar ratio respectively equal to 1.3, 2, 3, 4, 6 and 8 for the catalyst systems (1), (2), (3), (4), (5) and (6).

4 catalyst systems that did not conform to the invention were also prepared according to the same procedure apart from the following details:

The non-conforming catalyst system (7) having a ratio Nd/butadiene/DiBAH/HD=1/50/1.3/3 was prepared not from DEAC but from diethylaluminium sesquichloride. It is to be compared with the catalyst system 1 according to the invention.

The non-conforming catalyst system (8) with a ratio of Nd/butadiene/DiBAH/HD=1/50/3/3 was prepared not from neodymium tris[bis(2-ethylhexyl)phosphate] but from neodymium tris[2-ethylhexanoate]. It is to be compared with the catalyst system (3) according to the invention.

The non-conforming catalyst system (9) with a ratio Nd/butadiene/DiBAH/HD=1/50/0/3 was prepared without DiBAH (no alkylation). It is to be compared with the catalyst system (3) according to the invention.

The non-conforming catalyst system (10) with a ratio Nd/butadiene/DiBAH/HD=1/50/3/3 was prepared not at a neodymium concentration of 0.02 M but at a concentration of 0.0002 M. It is to be compared with the catalyst system (3) according to the invention.

II. Continuous Polymerization of Butadiene in Solution Using these Catalyst Systems 2, 4, 5 and 6

1) Procedure Followed for the Various Polymerizations:

The polymerization was carried out in these examples on a continuous line having two identical 14-liter reactors R1 and R2 in series, of which the temperatures were respectively set at 90° C. and 98° C., and the residence time to 45 minutes per reactor.

The diene monomer to be polymerized (i.e. the butadiene, abbreviated to Btd), the polymerization solvent (methylcyclohexane: MCH) and the alkylaluminium compound (DiBAH) were injected into a line inlet in a dynamic mixer provided upstream of the two reactors, then the mixture thus obtained was introduced into the first reactor R1. Each catalyst system tested, 1 to 4, was injected directly into this first reactor with mechanical stirring via blades.

The polymerization stopper and the antioxidant used were oleic acid, in 1 pce, and N-1,3-dimethylbutyl-N'-phenyl-para-phenylenediamine, in 0.5 pee (pce: parts by weight per 100 parts of elastomer obtained). This polymerization stopper and this antioxidant were injected one after another on leaving the reactors, upstream of the static mixers.

The amount of neodymium in each catalyst system is expressed in μmol per 100 g of butadiene monomer (amount expressed in μMcm hereinafter).

2) Polymerization Tests Carried Out Using these Catalyst Systems:

a) Tests A to E according to the invention carried out via said catalyst system 2:

The results that appear in Table 1 below illustrate the flexibility offered by the injection into a line inlet of an amount of alkylaluminium compound (pre-added DiBAH) which varied from 400 to 1000 mol per 100 g of butadiene monomer (μMcm hereinafter), in terms of characteristics of the polybutadienes obtained:

Mooney viscosity ML (1+4) and fluidity;

level of cis-1,4, trans-1,4 and 1,2 linkages measured by the "NIR" technique described in Appendix 1;

number-average molecular weight $M_n$ and polydispersity index Ip, measured by the size exclusion chromatography (SEC) method described in Appendix 2;

cotan δ, measured according to Appendix 3; and cold flow, measured according to Appendix 4.

The catalyst system 2 used which had the formula $Nd(P_2O_4)_3$/Btd/DiBAH/DEAC=1/50/2/3, was incorporated into the polymerization medium in a same amount of 188 μMcm for each test A to E, following said alkylaluminium compound.

The degrees of conversion in each of the reactors R1 and R2 will be denoted below by the abbreviations CR1 and CR2.

TABLE 1

| | Polymerization | | | Characteristics of the polybutadienes obtained | | | | | | | | |
|---|---|---|---|---|---|---|---|---|---|---|---|---|
| Tests | Pre-added DiBAH (μMcm) | CR1 (%) | CR2 (%) | ML (1 + 4) | cis-1-4 (%) | trans-1,4 (%) | 1,2 (%) | Mn (g/mol) | Ip | Cold flow (g) | F 150 fluidity * | cotan δ |
| A | 400 | 100 | 100 | 79.5 | 94.2 | 5.3 | 0.5 | 173052 | 2.06 | 0.05 | 43 | 1.10 |
| B | 500 | 99 | 100 | 67.4 | 93.7 | 5.8 | 0.5 | 161376 | 2.03 | 0.02 | 52 | 1.02 |
| C | 600 | 100 | 100 | 56.5 | 93.0 | 6.5 | 0.5 | 147159 | 2.01 | 0.06 | 64 | 1.01 |
| D | 800 | 100 | 100 | 44 | 92.2 | 7.2 | 0.6 | 126927 | 2.02 | 0.10 | 78 | 0.98 |
| E | 1000 | 98 | 100 | 34 | 91.2 | 8.2 | 0.6 | 122594 | 1.94 | 0.19 | 100 | 0.97 |

*average of 3 measurements

This Table 1 essentially shows that the polymerization kinetics are approximately identical, whatever the amount of alkylaluminium compound added to the monomer to be polymerized before the addition of the catalyst system to the latter.

The graph from FIG. 1 shows that that the Mooney viscosity ML(1+4) at 100° C. of the polybutadienes obtained in these tests A to E varies greatly with the amount, with respect to the butadiene, of the alkylaluminium compound DiBAH introduced prior to the polymerization catalyst and that, the higher this amount of the alkylaluminium compound, the more the Mooney viscosity of the polybutadiene obtained is reduced.

Figure 2:
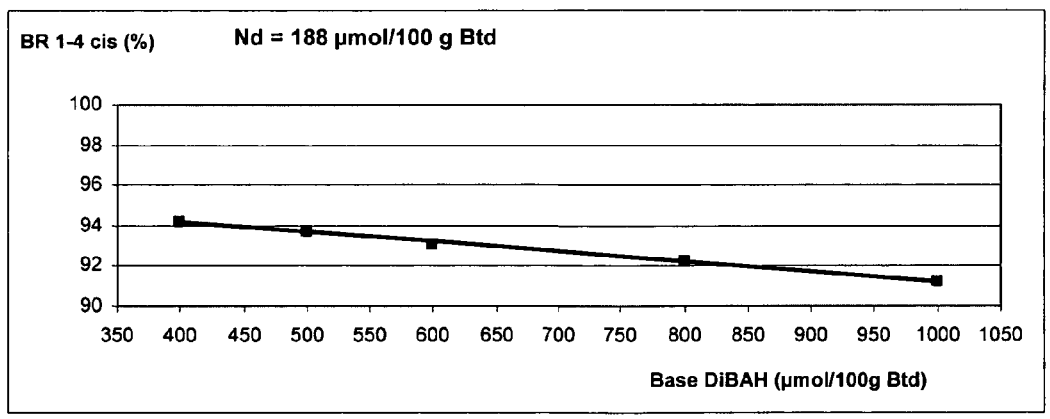
FIG. 2 is a graph illustrating the variation of the level of cis-1,4 linkages of these same polybutadienes as a function of the aforementioned amount of this alkylaluminium compound.

The graph from FIG. 2 shows that the level of cis-1,4-linkages of the polybutadienes obtained in these tests A to E is approximately constant when the amount of the alkylaluminium compound DiBAH introduced prior to the polymerization catalyst varies under the same conditions, this level of cis-1,4 linkages being been 91% and 95%.

In other words, for a catalyst system having a predetermined Al/Nd molar ratio (equal to 2 for these tests A to E) which is introduced in a given amount, it is possible, due to an addition of a variable amount of the alkylaluminium compound to the monomer to be polymerized, before addition of the catalyst system, to obtain a wide range of polybutadienes having different macrostructure characteristics, without penalizing the polymerization kinetics nor the microstructure of these polybutadienes.

This Table 1 shows that the cold flow remains low whatever the amount of the alkylaluminium compound added to the monomer(s) to be polymerized before the addition of the catalyst system to the latter.

b) "Control" test F carried using the catalyst system 6 and tests G, H, I according to the invention carried out using the catalyst systems 2 and 5:

The results appearing in Table 2 below illustrate, in particular, the relative catalyst cost benefit procured by the injection into the line inlet of an amount of the same DBiBAH compound which varies from 0 to 735 μMcm for polybutadienes obtained which have amongst themselves approximately the same macrostructure and microstructure characteristics.

Indicated for each test are the amounts of DiBAH which are used, on the one hand, in the corresponding catalyst system (abbreviated to "cat. syst.") and, on the other hand, as a "pre-addition" into the line inlet of the polymerization medium, being specified that the "control" test F is not characterized by any pre-addition of DiBAH compound.

The catalyst systems 2, 5 and 6 respectively have the formula $Nd(P_2O_4)_3/Btd/DiBAH/DEAC=1/50/2$ or 6 or 8/3, and each of them is incorporated into the polymerization medium in an amount of 188 μMcm for the tests F, G, H and 60 μMcm for the test I.

These various tests show that in order to obtain a polybutadiene having a high and approximately constant level of cis-1,4 linkages (greater than 92%) and a Mooney viscosity ML(1+4) greater than 40 and approximately equal to 43, it is possible to use:

either the catalyst system 6 having a high Al/Nd molar ratio=8 ("control" test F);

or the catalyst systems 5 or 2 having a lower Al/Nd molar ratio=6 or 2, respectively, combined with an amount of pre-added DiBAH which is then chosen to be accordingly higher as the Al/Nd ratio of the catalyst system is lower (tests G and H).

In other words, the tests F, G and H show that the characteristics of a polybutadiene obtained with the catalyst system 6 having a high Al/Nd ratio has managed to be reproduced by using the same proportions of a catalyst system 2 or 5 having a lower Al/Nd ratio, the deficit of aluminium inherent to this lower ratio being compensated for by the pre-addition of DiBAH to the polymerization medium.

It should be noted that this use of a catalyst system having a low Al/Nd ratio (for example less than or equal to 6) in amounts which are those of a greater ratio (for example equal to 8) combined with additional DiBAH pre-incorporated into a line inlet is a solution that is overall less expensive as shown by the last column of Table 2 and, consequently, advantageous from an industrial viewpoint.

It should moreover be noted that it is even possible to further minimize the catalyst cost of the polymerization by reducing to the minimum the amount (160 μMcm) of this catalyst system having a low Al/Nd ratio, while still obtaining an approximately identical polybutadiene, as is shown by test I with the catalyst system 2.

c) "Control" tests J, L and P respectively carried out using the catalyst systems 4, 5 and 6 and tests K, M, N, O, Q, R, S, T according to the invention all carried out using the catalyst system 2:

The results appearing in Table 3 below illustrate the flexibility provided by the injection, into a line inlet, of a variable amount of the alkylaluminium compound (DiBAH), with respect to fluctuations in the impurities (abbreviated to "impur." below, in ppm) due to the recycled solvents which are present in this line inlet.

The catalyst systems 2, 4, 5 and 6 used correspond respectively to the formula $Nd(P_2O_4)_3/Btd/DiBAH/DEAC=1/50/2$, 4, 6 and 8/3.

The impurities present in the line inlet were toluene, ethyl tetrahydrofurfuryl ether ("ETE" hereinbelow) and styrene ("Sty" hereinbelow).

TABLE 2

| Tests | cat. syst.: Al/Nd | Nd (μMcm) | DiBAH (μMcm) Cat. syst. | DiBAH (μMcm) Pre- addn. | CR1 % | CR2 % | ML | cis-1,4 (%) | trans- 1,4 (%) | 1,2 (%) | F 150 Fluidity * | cotan δ | Cold flow (g) | Mn (g/mol) | Ip | Rel. cat. cost |
|---|---|---|---|---|---|---|---|---|---|---|---|---|---|---|---|---|
| F | 6: Al/Nd = 8 | 188 | 1504 | 0 | 87 | 100 | 42.7 | 93.4 | 6.0 | 0.6 | 86 | 0.91 | 0.15 | 131341 | 2.15 | 100 |
| G | 5: Al/Nd = 6 | 188 | 1128 | 200 | 90 | 99 | 43.5 | 93.1 | 6.3 | 0.6 | — | — | 0.12 | 133327 | 2.05 | 95.9 |
| H | 2: Al/Nd = 2 | 188 | 376 | 735 | 95 | 100 | 43.0 | 92.3 | 7.2 | 0.5 | 86 | 0.95 | 0.14 | 125275 | 2.03 | 90.5 |
| I | 2: Al/Nd = 2 | 160 | 320 | 735 | 98 | 100 | 43.9 | 93.8 | 5.7 | 0.5 | 89 | 0.94 | 0.13 | 135238 | 1.98 | 79.7 |

*average of 3 measurements

TABLE 3

| Tests | cat. Syst.: Al/Nd | Impur. (ppm) | Nd (μMcm) | DiBAH Pre-addn HDiBA (μMcm) | C R1 % | C R2 % | ML | cis-1,4 (%) | trans-1,4 (%) | 1,2 (%) | F 150 Fluid-ity * | cotan δ | Mn (g/mol) | Ip | Cold flow (g) | Rel. cat. cost |
|---|---|---|---|---|---|---|---|---|---|---|---|---|---|---|---|---|
| J | 4: Al/Nd = 4 | ETE 3 ppm | 360 | 0 | 97 | 100 | 44.6 | 89.4 | 10.0 | 0.6 | 77 | 0.96 | 128394 | 2.18 | 0.12 | 155.6 |
| K | 2: Al/Nd = 2 | | 360 | 560 | 100 | 100 | 43.0 | 89.7 | 9.7 | 0.6 | 83 | 0.91 | 127294 | 2.00 | 0.18 | 151.5 |
| L | 5: Al/Nd = 6 | ETE 0.5 ppm | 260 | 0 | 95 | 100 | 41.0 | 91.0 | 8.4 | 0.6 | 83 | 0.96 | 128235 | 2.04 | 0.15 | 125.6 |
| M | 2: Al/Nd = 2 | | 260 | 750 | 100 | 100 | 43.0 | 89.3 | 10.2 | 0.5 | 80 | 1.02 | 126858 | 2.08 | 0.09 | 117.9 |
| N | 2: Al/Nd = 2 | ETE/Sty 0.5/50 ppm | 260 | 650 | 100 | 100 | 44.7 | 91.6 | 7.8 | 0.6 | 94 | 0.97 | 131581 | 2.04 | 0.11 | 115.6 |
| O | 2: Al/Nd = 2 | | 160 | 650 | 93 | 100 | 47.2 | 95.8 | 3.7 | 0.5 | 85 | 0.83 | 139294 | 2.05 | 0.18 | 77.7 |
| P | 6: Al/Nd = 8 | none | 188 | 0 | 87 | 100 | 42.7 | 93.4 | 6.0 | 0.6 | 86 | 0.91 | 131341 | 2.15 | 0.15 | 39 |
| Q | 2: Al/Nd = 2 | | 188 | 735 | 95 | 100 | 43.0 | 92.3 | 7.2 | 0.5 | 86 | 0.95 | 125275 | 2.04 | 0.14 | 90.5 |
| R | 2: Al/Nd = 2 | | 160 | 735 | 98 | 100 | 43.9 | 93.8 | 5.7 | 0.5 | 89 | 0.94 | 135238 | 1.98 | 0.13 | 79.7 |
| S | 2: Al/Nd = 2 | Toluene 600 ppm | 160 | 735 | 98 | 100 | 40.0 | 93.7 | 5.7 | 0.6 | 107 | 0.88 | 128213 | 1.94 | 0.22 | — |
| T | 2: Al/Nd = 2 | Toluene 1000 ppm | 160 | 630 | 95 | 100 | 44.4 | 94.8 | 4.7 | 0.5 | 100 | 0.84 | 139674 | 1.94 | 0.17 | — |

*average of 3 measurements

It emerges from this Table 3 that the catalyst systems according to the invention tolerate all the more impurities when they each have a lower Al/Nd molar ratio (preferably equal to 2), that is to say when they are more active.

The result from this Table 3 furthermore confirm the conclusions of paragraph b) above, namely that, even in the presence of impurities in the line inlet, the characteristics of a polybutadiene obtained with a catalyst system having a high Al/Nd ratio manage to be reproduced by using, in the same amounts, a catalyst system having a lower Al/Nd ratio after having incorporated the alkylaluminium compound in the monomer to be polymerized.

Moreover, this prior incorporation of the alkylaluminium compound into the monomer to be polymerized makes it possible to not change the formula of the catalyst system in case the level of impurities in the line inlet increases (see the tests where the level of ETE changes from 0 to 3 ppm and where the level of toluene changes from 0 to 1000 ppm) in order to obtain a given polybutadiene. Thus, it is pointless, in order to do this, to change from a catalyst system with an Al/Nd ratio=8 to another having a ratio of 6 or 4, due to the fact it is sufficient to adjust the amount of alkylaluminium compound pre-incorporated and optionally that of the catalyst system (amount of Nd) to maintain the polybutadienes obtained in the expected specifications.

III. Batch Polymerization of Butadiene and Isoprene in Solution Using the Catalyst Systems 1, 2, 3, 5, 7, 8, 9 and 10

1) Procedure followed for the various polymerizations:
For these examples, the polymerization was carried out in 250 ml Steinie bottles, of which the leaktightness was ensured by an assembly of the "seal/pierced cap" type, allowing the reactants to be injected using syringes. The polymerization was carried out with a solvent/monomer weight ratio under an inert nitrogen atmosphere equal to 9.2. It was carried out dynamically with stirring and a temperature hold carried out in a thermoregulated water bath.

The diene monomer to be polymerized (i.e. butadiene, abbreviated to Btd, or isoprene) was first sparged with nitrogen.

A 250 ml Steinie bottle was charged with 132 ml of methylcyclohexane (MCH). After sparging with nitrogen for 10 minutes, 124 ml (95.5 g) of MCH remained in the bottle, to which 10.0 g of monomer previously sparged with nitrogen was added. The alkylaluminium, when there was some, was then injected by syringe followed by the catalyst in the amounts indicated in Table 4. The bottle was then placed under stirring at 50° C. for the time necessary to reach 100% monomer conversion. 1 ml of methanol was added to stop the reaction then 1 ml of a 20 g/l N-1,3-dimethylbutyl-N'-phenyl-para-phenylenediamine solution, intended to act as an antioxidant for the polybutadiene, was also added.

Figure 3:
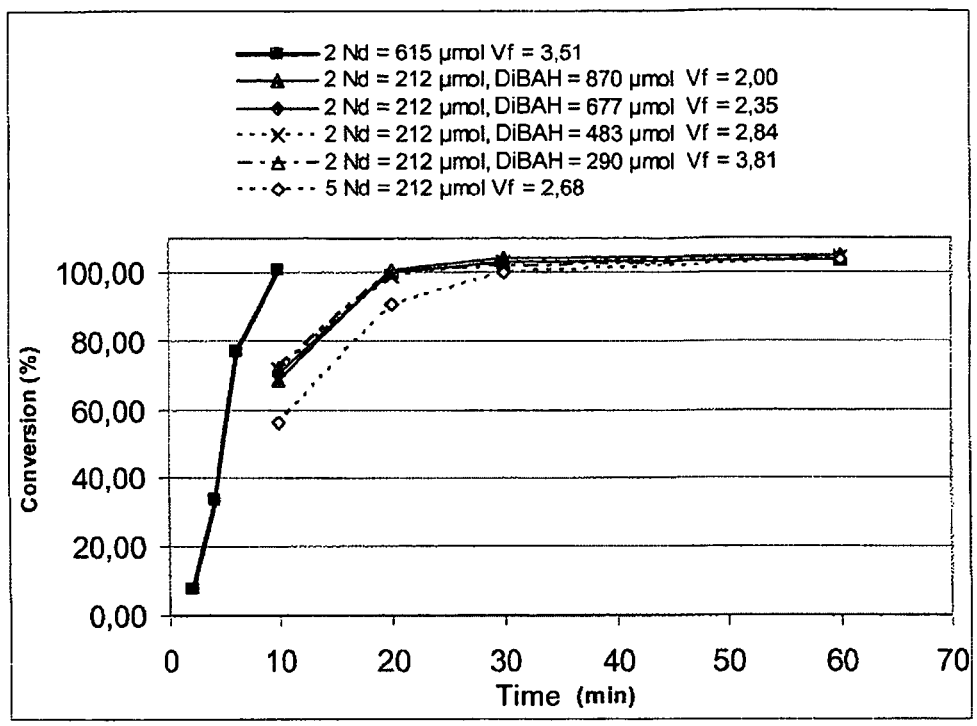
FIG. 3 is a graph illustrating the change in the degree of conversion (in %) of butadiene as a function of time (min), on the one hand for various alkylaluminium (added before the polymerization reaction)/rare-earth salt ratios, and on the other hand for a "control" test without alkylaluminium.
Figure 4:
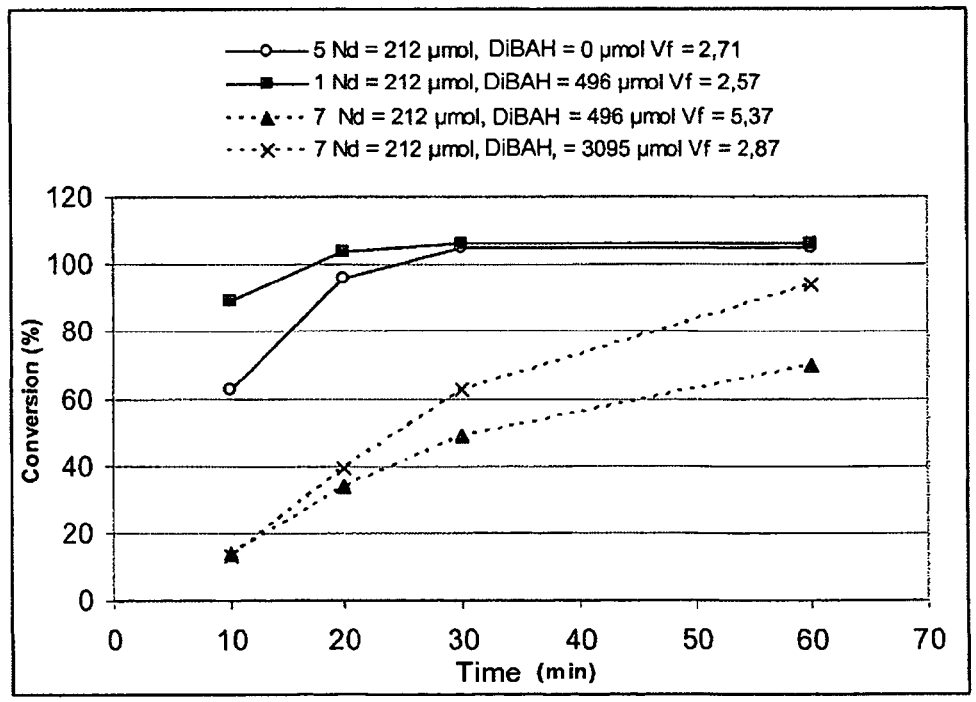
FIGS. 4 to 8 illustrates the advantages of the invention for butadiene and isoprene polymerization and compares this invention with catalyst systems which do not conform thereto.

2) Butadiene polymerization tests carried out using these catalyst systems:
a) Tests U to Z according to the invention carried out using the catalyst systems 2 and 5:
The results that appear in Table 4 below and FIG. 3 illustrate the increases in activity provided by a catalyst having a low ratio combined with an alkylaluminium with respect to a catalyst having a higher ratio equal to the total Al/Nd ratio of the preceding systems:

TABLE 4

| Tests | cat. syst.: Al/Nd | Nd (μMcm) | DiBAH (μMcm) Cat. syst. | DiBAH (μMcm) Pre-addn. | Total Al/Nd | Time (min) | C % | Final viscosity (dl/g) |
|---|---|---|---|---|---|---|---|---|
| U | 2: Al/Nd = 2 | 615 | 1230 | 0 | 2 | 10 | 100.7 | 3.51 |

TABLE 4-continued

| Tests | cat. syst.: Al/Nd | Nd (µMcm) | DiBAH (µMcm) Cat. syst. | DiBAH (µMcm) Pre-addn. | Total Al/Nd | Time (min) | C % | Final viscosity (dl/g) |
|---|---|---|---|---|---|---|---|---|
| V | 2: Al/Nd = 2 | 212 | 424 | 870 | 6.1 | 60 | 104.7 | 2.00 |
| W | 2: Al/Nd = 2 | 212 | 424 | 677 | 5.2 | 60 | 103.5 | 2.35 |
| X | 2: Al/Nd = 2 | 212 | 424 | 483 | 4.3 | 60 | 103.8 | 2.84 |
| Y | 2: Al/Nd = 2 | 212 | 424 | 290 | 3.3 | 60 | 103.4 | 3.81 |
| Z | 5: Al/Nd = 6 | 212 | 1272 | 0 | 6 | 60 | 103.2 | 2.68 |

These results, shown schematically in FIG. 3, clearly illustrate the fact that the polymerization is all the faster when the amount of neodymium is high (tests U to Y) and that, for a same amount of neodymium injected, these kinetics are barely influenced by the variations of alkylaluminium added with the catalyst (tests V to Y). It is also very clearly observed that the variation of the amount of alkylaluminium added before the catalyst impacts directly and markedly on the viscosity of the polymer obtained. Thus, the higher the amount of alkylaluminium, the lower the viscosity.

These results also show that for a given Al/Nd ratio, the activity of the catalyst system is not the same when this Al/Nd ratio is intrinsic to the catalyst or when it results from the combination of a catalyst with an alkylaluminium. Thus, in the case of test V involving a total Al/Nd ratio=6.1 and for which the aluminium is derived both from the catalyst and the separate addition, a much better activity is observed than that which is obtained in test Z of which the total Al/Nd ratio=6, but for which all of the aluminium is supplied by the catalyst.

Thus, at a same total Al/Nd ratio, the activity is better in the case where part of the aluminium is added separately than in the case where the catalyst supplies all of the aluminum.

Finally, this table also shows the catalyst cost benefit provided by the use of the invention. This is because, when test X and test Z are compared, which result in very similar polybutadienes (viscosity around 2.75 dl/g), it is observed that in the case where the aluminium is partially added separately, the amount of total aluminium is less than that which it is necessary to add when it is carried out in a single supply via the catalyst.

b) Tests α to τ with catalysts that conform or not to the invention and with or without pre-addition of DiBAH:

The results that appear in Table 5 below and FIGS. 4, 5, 6, 7 and 8 illustrate various aspects of the invention (i.e., catalyst systems 1, 3, and 5) as compared to processes using non-conforming catalyst systems (i.e., catalyst systems 7, 8, 9, and 10). These catalyst systems are indicated in Table 5 by the numeral above the entry "Al/Nd" and in the figures by the numeral in front of "Nd."

TABLE 5

| Tests | cat. syst: Al/Nd | Nd (µMcm) | DiBAH (µMcm) Cat. syst. | DiBAH (µMcm) Pre-addn. | Temps (min) | % C | Final viscosity (dl/g) | cis-1,4 (%) | Mn (g/mol) and Ip |
|---|---|---|---|---|---|---|---|---|---|
| α | 5: Al/Nd = 6 | 212 | 1272 | — | 60 | 105.0 | 2.71 | 97.5 | 166095/1.69 |
| β | 1: Al/Nd = 1.3 | 212 | 275.6 | 496 | 60 | 106.0 | 2.57 | 98.6 | 151110/1.75 |
| χ1 | 7: Al/Nd = 1.3 | 212 | 275.6 | 496 | 60 | 70 | 5.37 | — | — |
| χ2 | 7: Al/Nd = 1.3 | 212 | 275.6 | 3095 | 60 | 94 | 2.87 | 99.0 | 38856/8.98 |
| δ1 | 3: Al/Nd = 3 | 212 | 636 | 328 | 60 | 104.1 | 2.57 | — | — |
| δ2 | 3: Al/Nd = 3 | 212 | 636 | 164 | 60 | 107.4 | 3.08 | — | — |
| ε1 | 3: Al/Nd = 3 | 212 | 636 | 164 | 90 | 40.2 | 7.81 | — | — |
| ε2 | 8: Al/Nd = 3 | 212 | 636 | 328 | 90 | 61.9 | 6.64 | — | — |
| ε3 | 8: Al/Nd = 3 | 212 | 636 | 738 | 90 | 84.0 | 6.01 | — | — |
| φ1 | 3: Al/Nd = 3 | 212 | 636 | 246 | 60 | 104.6 | 2.67 | 96.7 | 189310/1.55 |
| φ2 | 3: Al/Nd = 3 | 212 | 636 | 82 | 60 | 103.1 | 3.36 | 97.3 | 258009/1.52 |
| γ1 | 9: Al/Nd = 0 | 212 | 0 | 2049 | 1020 | 103.2 | 5.53 | — | — |
| γ2 | 9: Al/Nd = 0 | 212 | 0 | 983 | 1020 | 99.5 | 7.11 | — | — |
| γ3 | 9: Al/Nd = 0 | 212 | 0 | 574 | 1020 | 80.7 | 7.76 | — | — |
| η1* | 3: Al/Nd = 3 | 212 | 636 | 332 | 60 | 100.7 | 2.60 | — | — |

TABLE 5-continued

| Tests | cat. syst: Al/Nd | Nd (μMcm) | DiBAH (μMcm) Cat. syst. | DiBAH (μMcm) Pre-addn. | Temps (min) | % C | Final viscosity (dl/g) | cis-1,4 (%) | Mn (g/mol) and Ip |
|---|---|---|---|---|---|---|---|---|---|
| η2* | 3: Al/Nd = 3 | 212 | 636 | 254 | 60 | 101.3 | 2.90 | — | — |
| ι1* | 10: Al/Nd = 3 | 212 | 636 | 509 | 90 | 79.6 | 6.31 | — | — |
| ι2* | 10: Al/Nd = 3 | 212 | 636 | 254 | 90 | 76.9 | 7.39 | — | — |
| ι3* | 10: Al/Nd = 3 | 212 | 636 | 177 | 90 | 75.3 | 7.10 | — | — |

*For practical reasons, these polymerizations were carried out with an MCH/butadiene weight ratio equal to 13.

The results of Table 5 are illustrated in FIGS. 4-7.

Firstly, it is seen that it is not advantageous to use diethylaluminium sesquichloride in place of diethylaluminium chloride because, all things otherwise being equal, this causes a strong deterioration of the catalytic activity (cf. FIG. 4), a very large increase in the viscosities and a degradation of the macrostructure (of the Ip).

Figure 5:
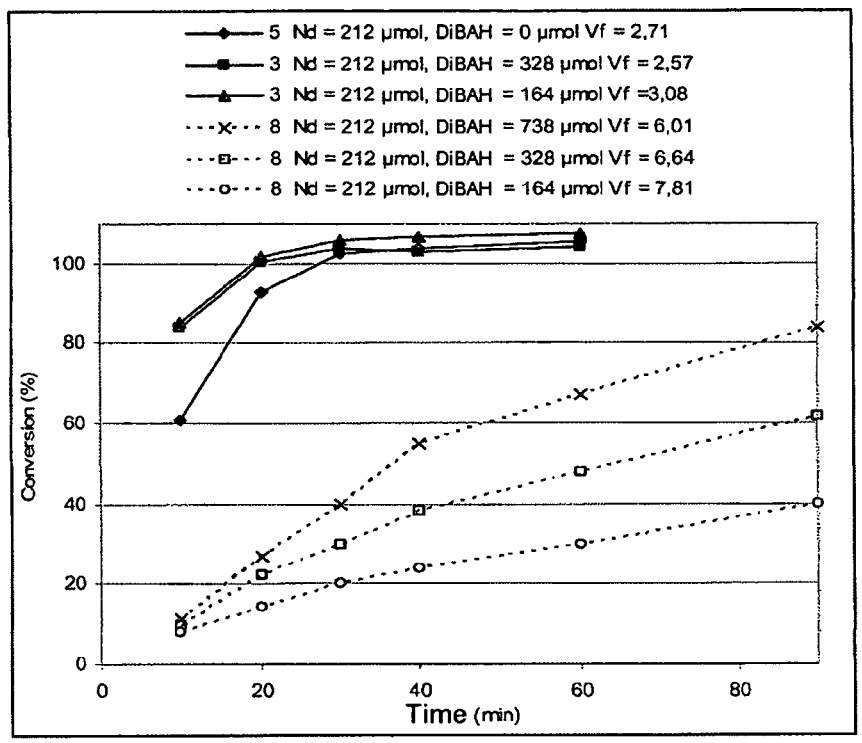

Similarly, the non-conforming catalyst based on neodymium carboxylate (8) gives worse results than the similar catalyst according to the invention based on neodymium phosphate (3). These results are illustrated in FIG. 5. The kinetics and the viscosities are strongly deteriorated here too, however in a less pronounced way than with the catalyst based on diethylaluminium sesquichloride (7). To recapture a viscosity of 2.4 dl/g, given the trends which emerge from the ε tests, it is stressed that it would be necessary to exceed the 2000 μMcm of DiBAH added separately which would involve an unacceptable increase in the catalyst cost.

Figure 6:
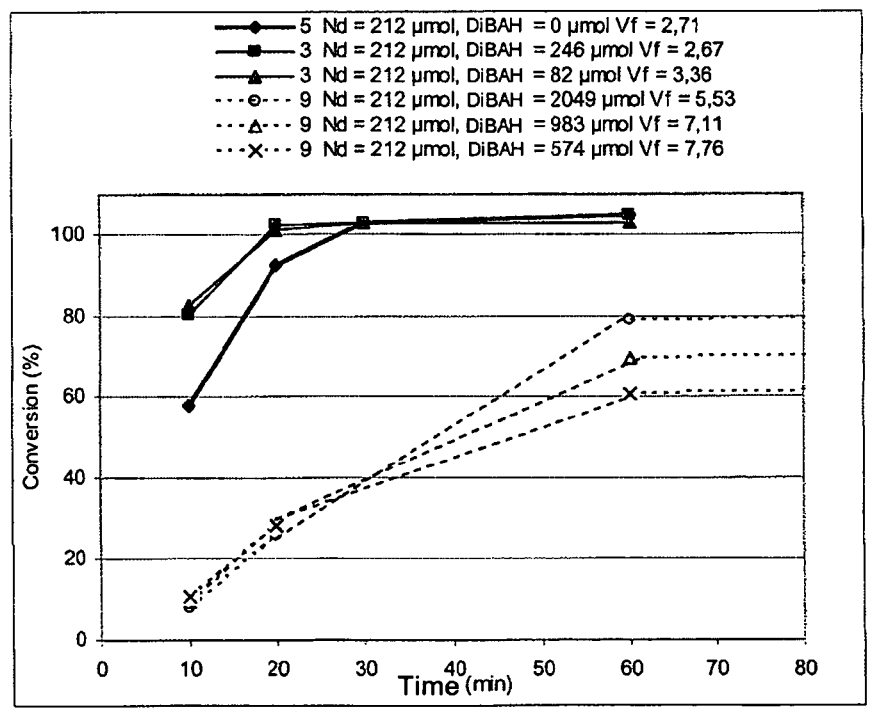
Figure 7:
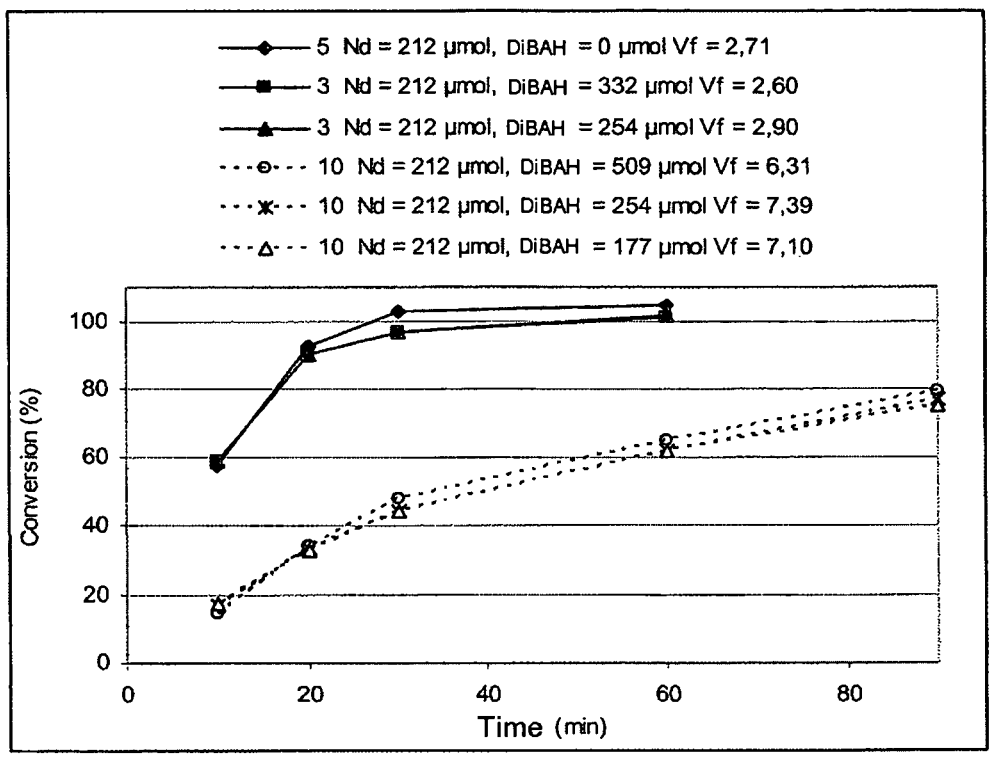

The results from Table 5 illustrated in FIG. 6 show that it is not advantageous to introduce all of the alkylaluminium (alkylating agent+alkylaluminium compound) in a single go, by separate addition with respect to the neodymium catalyst as is the case with the catalyst (9) when, used as an alkylaluminium that is added separately, is the same compound as that used as an alkylating agent being incorporated into the composition of the catalyst, and when it is essential that the catalyst already contains some of the alkylaluminium, in order to have a catalytic activity that is satisfactory on the industrial scale while resulting in a polymer that has satisfactory properties for a use in tyre cover treads with an acceptable catalyst cost.

Finally, the results obtained with the catalyst (10) clearly illustrate the difficulties proposed by too low a concentration of neodymium. Specifically, a dilution factor of 100 leads to a strong deterioration in the kinetics (FIG. 7) and a pronounced increase in the viscosities. Thus, to obtain, with the dilute catalyst (10), a polybutadiene of the same viscosity as that of the control, it would be necessary to considerably increase the amount of DiBAH added separately. Similarly, to accelerate the polymerization kinetics catalysed by the catalyst (10), it would be necessary to increase the amount of neodymium injected. This would be very detrimental to the catalyst cost.

Figure 8:
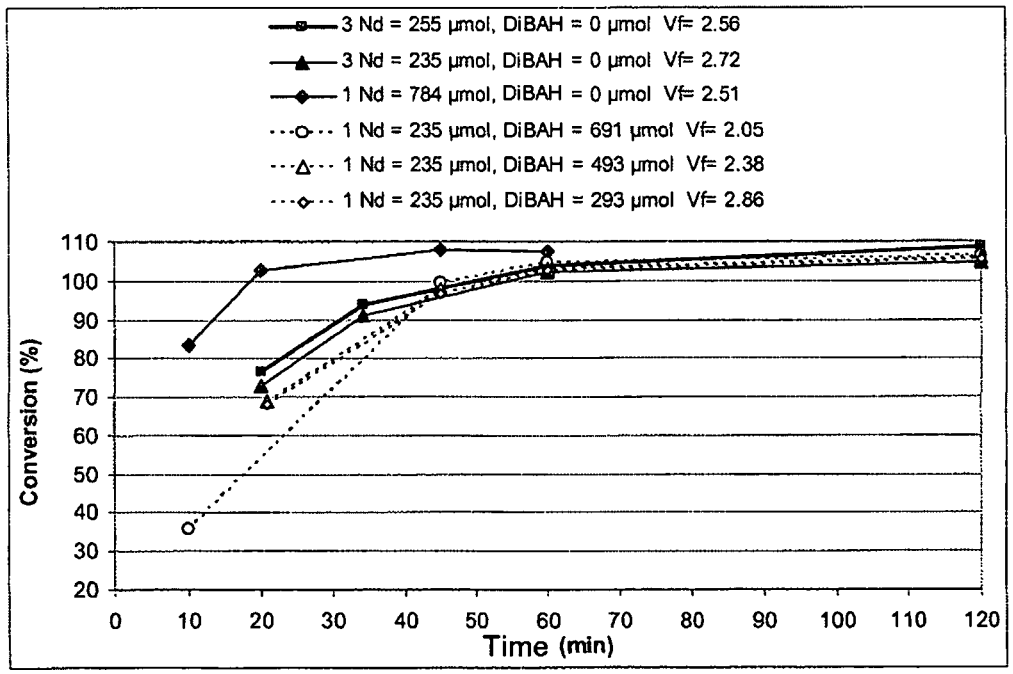

3) Isoprene polymerization tests carried out using the catalyst systems 1 and 3:

The results, illustrated in FIG. 8, which appear in Table 6 below, illustrate the application of the invention to the polymerization of isoprene.

TABLE 6

| Tests | cat. syst.: Al/Nd | Nd (μMcm) | DiBAH (μMcm) Cat. Syst. | DiBAH (μMcm) Pre-addn. | Time (min) | % C | Final viscosity (dl/g) | cis-1,4 (%) | Mn (g/mol) and Ip |
|---|---|---|---|---|---|---|---|---|---|
| φ1 | 3: Al/Nd = 3 | 255 | 765 | — | 120 | 108.7 | 2.56 | 96.9 | 275865/1.92 |
| φ2 | 3: Al/Nd = 3 | 235 | 705 | — | 120 | 105.0 | 2.72 | — | — |
| κ1 | 1: Al/Nd = 1.3 | 784 | 1019.2 | — | 60 | 107.7 | 2.51 | 96.3 | 264834/1.93 |
| κ1 | 1: Al/Nd = 1.3 | 235 | 305.5 | 691 | 120 | 106.3 | 2.05 | — | — |
| κ1 | 1: Al/Nd = 1.3 | 235 | 305.5 | 493 | 120 | 106.0 | 2.38 | — | — |
| κ1 | 1: Al/Nd = 1.3 | 235 | 305.5 | 296 | 120 | 105.6 | 2.86 | 96.9 | 284144/2.18 |

IV. Continuous Polymerization of Butadiene in Bulk Using the Catalyst System 2

The polymerization was carried out here in a 36 l reactor having Z blades, equipped with a cooling jacket, a condenser and an endless screw. The solvent used was pentane and the solvent/monomer weight ratio under an inert atmosphere of nitrogen was equal to 1. The residence time was set at 90 minutes and the temperature of the jacket was kept at 40° C.

The butadiene was injected into the solvent stream (contact time ~3 s) followed by the DiBAH (maximum contact time ~1 s). This mixture was added to the reactor in which the catalyst also arrived via an independent injection path. After a residence time of 90 minutes, the polybutadiene was stopped then subjected to an antioxidant operation via injection of a mixture of oleic acid (1 pce) and N-1,3-dimethylbutyl-N'-phenyl-para-phenylenediamine (0.5 pce) added at the outlet of the reactor. The polymer was then stripped then dried.

Table 7 gives the results obtained for the polymerization and for the resulting product:

TABLE 7

| Tests | cat. syst.: Al/Nd | Nd (µMcm) | Cat. Syst. | DiBAH (µMcm) Pre-addn. | % C | ML | cis-1,4 (%) | trans-1,4 (%) | 1,2 (%) | F 150 fluidity * | Mn (g/mol) and Ip | Cold flow (g) |
|---|---|---|---|---|---|---|---|---|---|---|---|---|
| λ | 2: Al/Nd = 2 | 70 | 140 | 1060 | 100 | 45 | 96.7 | 2.8 | <0.5 | 91 | 1382712.14 | 0.11 |

The polybutadiene obtained had similar characteristics to those of the test R. These results clearly illustrate the possibility of applying the catalyst system of the present invention to polymerization in bulk in just as an effective a manner as in solution.

APPENDIX 1

Determination of the Microstructure of the Polybutadienes and Polyisoprenes Obtained The near-infrared (NIR) assay technique was used. This is an indirect method requiring "control" elastomers whose microstructure has been measured by the $^{13}$C NMR technique. The quantitative relationship (Beer-Lambert law) that exists between the distribution of monomers in an elastomer and the shape of the elastomer NIR spectrum is used. This technique is carried out in two steps:

1) Calibration:
   The respective spectra of the "control" elastomers are acquired.
   A mathematical model is established associating one microstructure with a given spectrum, this being done using the method of partial least squares (PLS) regression that relies on a factorial analysis of the spectral data. The following two documents relate, in an in-depth manner, to the theory and use of this method for analysing "multivariant" data:
   (1) P. Geladi and B. R. Kowalski
   "Partial Least Squares regression: a tutorial"
   Analytica Chimica Acta, vol. 185, 1-17 (1986).
   (2) M. Tenehaus
   "La régression PLS—Théorie and pratique" (PLS regression—theory and practice)
   Paris, Editions Technip (1998).
2) Measurement:
   The spectrum of the sample was recorded.
   The microstructure was calculated.

APPENDIX 2

Determination of the Molar Weight Distribution of the Polybutadienes Obtained via the Size Exclusion Chromatography (SEC) Technique a) Measurement principle:

Size exclusion chromatography (SEC) makes it possible to physically separate the macromolecules in solution according to their size through columns filled with a porous gel. The macromolecules are separated according to their hydrodynamic volume, those with the largest volumes being eluted first.

Without being an absolute method, SEC allows the molecular weight distribution of a polymer to be assessed. The various number-average ($M_n$) and weight-average ($M_w$) molecular weights may be determined and the polydispersity index ($Ip=M_w/M_n$) calculated, via a Moore calibration, from commercial standards.

b) Preparation of the polymer:

There is no particular treatment of the polymer sample before analysis. It is simply dissolved in tetrahydrofuran at a concentration of around 1 g/l.

c) SEC analysis:

Case c1) The equipment used is a Waters Alliance chromatographic system. The eluting solvent is tetrahydrofuran, the flow rate is 1 ml/min, the temperature of the system is 35° C. and the analysis time is 30 min. A set of two Waters columns having the commercial name Styragel HT6E is used.

The injected volume of the polymer sample solution is 100 µl. The detector is a Waters 2140 differential refractometer and the software for processing the chromatographic data is the Waters Millennium system.

Case c2) The equipment used is a Waters Alliance chromatograph. The eluting solvent is tetrahydrofuran, the flow rate is 0.7 ml/min, the temperature of the system is 35° C. and the analysis time is 90 min. A set of four Waters columns is used in series, the columns having the commercial names Styragel HMW7, Styragel HMW6E and Styragel HT6E (two columns).

The injected volume of the polymer sample solution is 100 µl. The detector is a Waters model RI32X differential refractometer and the software for processing the chromatographic data is the Waters Millennium system.

In both cases, the average molecular weights calculated are relative to a calibration curve produced for polybutadienes with the following microstructure: 11% by weight of type 1,2 units and 48% by weight of type trans-1,4 units.

APPENDIX 3

Measurements of the Viscoelastic Indices Cotan δ

For the purpose of characterizing the degree of branching of the polybutadiene samples obtained according to the invention, their viscoelastic index (vei) was measured. This vei expresses the ratio of the elastic part to the viscous part (G'/G" for a deformation of 20% at 130° C. and 0.033 Hz) and corresponds to the reciprocal of the tangent of the loss angle (tan δ):

1) Machine used:
   The machine used is sold by Alpha Technologies under the name "RPA2000" (Rubber Process Analyzer). It allowed measurement of the dynamic properties of the elastomers and of the rubber compositions incorporating them.
2) Sample preparation:
   The weight of polybutadiene sample is 4.5+/−0.5 g. Protection of the plates of the RPA2000 (see below) is provided by the use of intermediate films which are obtained from a roll of Nylon® Dartek f0143 film and which are placed between these plates and the sample.
3) Description of the test:
   The sample is preheated for three minutes at 130° C. in the thermally stabilized "RPA" chamber before carrying out 10 dynamic stress cycles while oscillating at a frequency of 0.033 Hz to 16,667 Hz, with 20% deformation at 130° C. The calculation of the results is an average over the last five cycles.

APPENDIX 4

Cold Flow Measurements

For the purpose of characterizing the degree of branching of the polybutadiene samples obtained according to the invention, their cold flow was measured. Cold flow is a characteristic phenomenon of the elastomers, of which the measurement expresses the ability of the product to flow under a slight stress. This method stresses the products at a low shear rate, which makes it possible to characterize the macrostructure of the elastomers in terms of degree of branching, this increasingly limiting the cold flow when it is high.

Moreover, the cold flow measurement makes it possible to assess the "tackiness" of the gum at the finishing phase.

This characterization consists in measuring the weight of gum which flows through a calibrated die (diameter=6.35 mm, thickness=0.5 mm), under a fixed load (weight of 1 kg), over a given time (6 h), at a temperature of 100° C.

1) Machine used:

The equipment for the cold flow measurement comprised a cylindrical section pierced at the base. The measurement requires the aforementioned calibrated load of 1 kg and a ventilated oven.

2) Sample preparation:

The gum sample on which the measurement is carried out must have a weight of 40+1-5 g. The overall dimensions of the sample are around 2 cm in thickness for a diameter of 53 mm.

The sample must be free of air bubbles. For this, it is necessary to produce, in a press, 4 discs of gum with a thickness of 5 mm using a thick spacer made of stainless steel.

3) Description of the test:

Around 40 g of gum is placed in the machine. The calibrated load of 1 kg is placed on the disc of gum. The assembly is then placed in a ventilated oven, previously preheated to 100° C. and therefore temperature-stable. During the first hour in the oven, the measurement conditions are not stabilized. After 1 hour, the product extruded is cut off and thrown away.

The measurement then lasts 6 h, during which the product is left in the oven. At the end of 6 hours, the product sample must be recovered by making a cut therein level with the surface of the base. The result of this test is the weight of gum weighed (in g).

The invention claimed is:

1. Process for preparing a diene elastomer, comprising a continuous or batch polymerization reaction, in solution or in bulk, of at least one conjugated diene monomer with a catalyst system, said catalyst system being based on at least:
    one preforming conjugated diene monomer;
    one organic phosphoric acid salt of one or more rare-earth metals, said salt being in suspension and in at least one saturated, aliphatic or alicyclic, inert hydrocarbon-based solvent;
    one alkylating agent composed of an alkyl aluminium of formula $AlR_3$ or $HAlR_2$ in which R represents an alkyl radical and H a hydrogen atom; and
    a halogen donor belonging to the family of alkylaluminium halides, with the exclusion of alkylaluminium sesquihalides,
    wherein at least one alkylaluminium compound of formula $AlR_3$ or $HAlR_2$ in which R represents an alkyl radical and H represents a hydrogen atom, which is identical or not to that of said catalyst system, is separately introduced at a time different from the time of introduction of the catalyst system, into an industrial polymerization unit; and
    wherein the separately introduced alkylaluminium compound and the alkylating agent are present in a molar ratio that varies from 0.05 to 3.

2. Process according to claim 1, wherein all of the separately introduced alkylaluminium compound(s) of formula $AlR_3$ or $HAlR_2$ wherein R and H have the same meanings as in claim 1 added is introduced into the industrial polymerization unit before the introduction of the catalyst system.

3. Process according to claim 1 wherein prior to the polymerization reaction, the separately introduced alkylaluminium compound of formula $AlR_3$ or $HAlR_2$, wherein R and H have the same meanings as in claim 1 is brought together with the conjugated diene monomer(s) to be polymerized.

4. Process according to claim 1 wherein prior to the polymerization reaction, the separately introduced alkylaluminium compound of formula $AlR_3$ or $HAlR_2$, wherein R and H having the same meanings as in claim 1 is brought together with the conjugated diene monomer(s) to be polymerized and the polymerization solvent.

5. Process according to claim 1, wherein the alkylating agent/salt of rare-earth element(s) molar ratio in said catalyst system has a value ranging from 1 to 10.

6. Process according to claim 1, wherein the amount of said separately introduced alkylaluminium compound brought together with said conjugated diene monomer(s) to be polymerized varies from 10 to 5,000 μmol per 100 g of conjugated diene monomer(s) to be polymerized.

7. Process according to claim 6, wherein said separately introduced alkylaluminium compound is used in an amount ranging from 50 to 1,000 μmol per 100 g of conjugated diene monomer(s) to be polymerized, then said catalyst system is used in an alkylating agent/salt of rare-earth element(s) molar ratio ranging from 1 to 5.

8. Process according to claim 1, wherein said reaction is carried out continuously, said separately introduced alkylaluminium compound being brought together with said conjugated diene monomers) to be polymerized in a line inlet located upstream of at least one polymerization reactor.

9. Process according to claim 8, wherein said catalyst system is incorporated in its entirety in the industrial polymerization unit, in said line inlet.

10. Process according to claim 8, wherein said catalyst system is incorporated in its entirety in the industrial polymerization unit directly in said reactor.

11. Process according to claim 1, wherein said reaction is carried out in an inert hydrocarbon-based polymerization solvent or else in bulk.

12. Process according to claim 1, wherein said separately introduced alkylaluminium compound is diisobutylaluminium hydride.

13. Process according to claim 1, wherein said halogen donor is an alkylaluminium monohalide.

14. Process according to claim 1, wherein said salt is a tris[bis(2-ethylhexyl)phosphate] of rare-earth element(s).

15. Process according to claim 1, wherein said alkylating agent comprises diisobutylaluminium hydride.

16. Process according to claim 1, wherein said catalyst system comprises said rare-earth metal or metals in a concentration greater than or equal to 0.002 mol/l.

17. Process according to claim 1, wherein the halogen donor/salt molar ratio has a value ranging from 2 to 3.5.

18. Process according to claim 1, wherein the preforming conjugated diene monomer/salt molar ratio has a value ranging from 15 to 70.

19. Process according to claim 1, wherein said conjugated diene monomer to be polymerized is butadiene, in order to obtain a butadiene homopolymer having at the same time:
    a Mooney viscosity ML(1+4) at 100° C., measured according to the standard
    ASTM D 1646, which is greater than or equal to 40;
    a polydispersity index less than 2.1;
    a level of cis-1,4 linkages greater than 90%; and
    a reduced cold flow ranging from 0.01 g to 0.5 g.

20. Process according to claim 1, wherein said conjugated diene monomer to be polymerized is butadiene, in order to obtain a butadiene homopolymer having a cold flow ranging from 0.01 g to 0.3 g.

21. Process according to claim 1, wherein the conjugated diene monomer to be polymerized is isoprene in order to obtain a polyisoprene.

* * * * *